June 15, 1926.
H. W. SISSON
1,588,816
ANTIGLARE MEANS
Filed Nov. 9, 1925
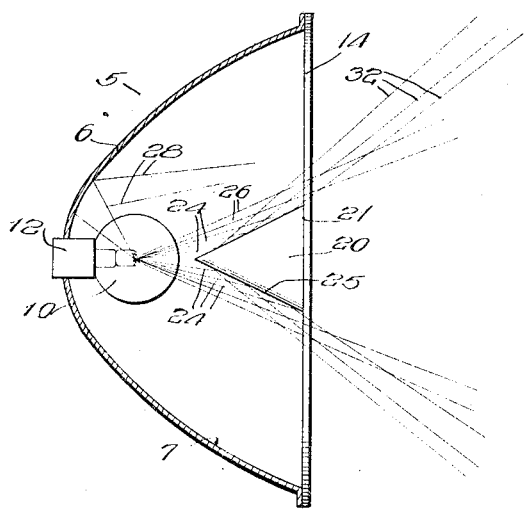
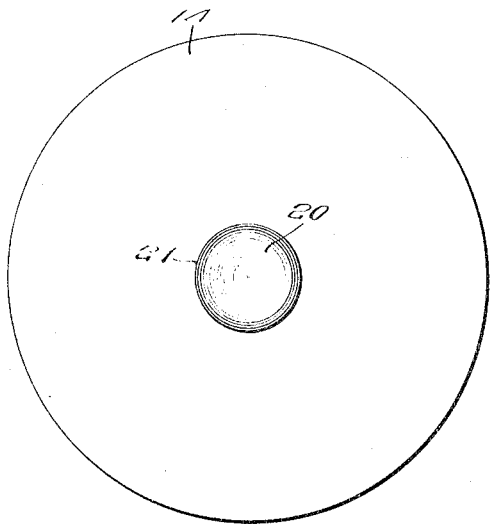
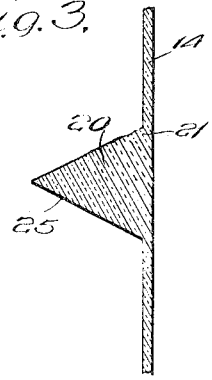
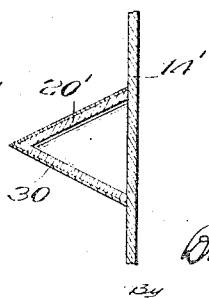
Inventor
Harry W. Sisson Patented June 15, 1926.

1,588,816

UNITED STATES PATENT OFFICE.

HARRY W. SISSON, OF CHICAGO, ILLINOIS.

ANTIGLARE MEANS.

Application filed November 9, 1925. Serial No. 67,730.

This invention relates to an anti-glare means particularly for automobile head lights and the like, and its objects are the provision of a generally improved, simplified and inexpensive means that will screen the direct rays or beams of light from approaching vehicles or the eye without choking or interfering with the rays which do not glare or dazzle and to direct the screened rays out into the field of illuminating rays to increase the intensity and field of driving illumination ahead.

The invention is illustrated in the accompanying drawings, in which—

Figure 1 is a central longitudinal section through a headlight embodying the invention;

Figure 2 is an elevational view of the inner or rear side of the lens of the lamp illustrated in Figure 1 showing the antiglare means therebehind;

Figure 3 is a fragmentary diametrical section through the lens of Figure 2; and

Figure 4 is a sectional view similar to Figure 3 of a modification.

The headlight shown is designated generally at 5. It may be of any suitable or preferred type. The details of the lamp per se, forms no part of the present invention and the disposition, shape and formation of the anti-glare means of the present invention may be varied to secure the best results with the particular lamp in question. With a regular parabolic reflector and the lamp mounted in the focus thereof the anti-glare means may be disposed substantially centrally but this will vary with different reflectors, lamp dispositions and with different styles of lamps.

Suffice it to say that the particular head light shown comprises a shell or casing 6, the inner concave surface 7 of which may be polished or finished to provide a reflector and the incandescent or electric light bulb 10 is suitably mounted in the usual or any suitable manner, usually in the focus of the reflector 7. The bulb 10 is provided with a suitable connector 12 and of course the shell and reflector may be separate or independent instead of the inside of the shell constituting the reflector, as shown. At the front the device is provided with the usual or any suitable lens 14 through which the direct and reflected rays are directed ahead.

The anti-glare means comprise a member 20 of pointed or subulate configuration disposed in front of the lamp 10 to screen the same from the direct vision of approaching drivers. The member 20 may be of solid or hollow formation and it may be formed integral with the lens 14 or separately and otherwise suitably disposed and mounted in front of the lamp 10.

In Figures 1, 2 and 3, the member 20 is shown of solid conical formation, but as already pointed out, it may be hollow and the formation may be pyramidal, semispherical or of any other suitable pointed or subulate form having a base and diminishing therefrom. In Figures 1, 2 and 3, the base 21 of the member 20 is formed integral with the lens 14, whereas in Figure 4, the hollow member 20' is entirely separate or independent of the lens 14'. Where a separate member 20' is employed, it may be cemented to the lens 14' or otherwise suitably mounted or positioned in front of the light 10.

The member 20' may be made up of glass, clear or ground, metal, wood, fibre paper, or any other suitable material or combination of materials. It is preferably opaque, semi-opaque or translucent to screen the direct rays from the approaching drivers' field of vision and it may be covered or otherwise finished.

In operation, the base 21 of the member 20 or 20', as the case may be, screens the light from the direct vision of approaching drivers, thereby screening the direct rays 24 which would otherwise be projected into the eyes of the approaching drivers from the approaching drivers' field of vision. The tapered or diminishing end 25 is shown as being disposed adjacent the light and centrally with respect thereto and its diminishing formation permits the direct rays 26 which are dispersed sufficiently that they will not strike the eyes of the approaching driver to continue on out and join the reflected rays 28 in illuminating the course ahead of the automobile. The tapering surface 25 of the member 20 or 20' may be polished or finished as shown at 30 in Figure 4 to provide a more effective reflector for assuring reflection of the screened-out direct rays 24 out at 32 into the field of driving illumination.

I have constructed and used the invention as thus described and find that the results are a total absence of glaring and dazzling rays upon approaching drivers and because of non-interference with such direct rays as do not strike the eyes of the approaching driver and reflection of the screened rays out into the field of the other direct and reflected rays, the intensity and field of driving illumination ahead is increased. This field of driving illumination is directed out in generally conical configuration so as to not only strike the road sufficiently ahead of the vehicle to properly illuminate the same, but also to light up the side of the road, also the course on the opposite side of the car and also to light up road signs, house numbers and the like which is a distinct advantage in night driving with the desirability of following the edge of road and road signs, and at the same time providing adequate driving illumination ahead without glaring or blinding approaching drivers.

I claim:—

1. In a headlight having a source of light therein, the combination of a lens comprising a transparent disc having a solid transparent anti-glare member provided with a base formed integral with the lens substantially on the axis thereof, said base being directed outwardly away from the light and said member tapering to a point toward the light and disposed wholly within the headlight to screen and deflect the axial rays.

2. In a headlight having a source of light therein, the combination of a glass lens having a solid glass cone with its base formed integral with the lens and disposed substantially on the axis thereof, said base being directed outwardly away from the light and said cone tapering toward the light with its apex adjacent the light to screen and deflect the axial direct rays.

In witness whereof, I hereunto subscribe my name this 5th day of November, 1925.

HARRY W. SISSON.